United States Patent
Welche et al.

(10) Patent No.: US 11,095,938 B2
(45) Date of Patent: *Aug. 17, 2021

(54) ONLINE VIDEO EDITOR

(71) Applicant: Pond5 Inc., New York, NY (US)

(72) Inventors: Mathieu Frederic Welche, Irvine, CA (US); Hugo Valentín Elías García, Mexico City (MX); Taylor James McMonigle, Los Angeles, CA (US); Pier Stabilini, Santa Monica, CA (US); Nicola Onassis, Miami Beach, FL (US)

(73) Assignee: POND5 INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/690,632

(22) Filed: Nov. 21, 2019

(65) Prior Publication Data

US 2020/0314487 A1    Oct. 1, 2020

Related U.S. Application Data (63) Continuation of application No. 16/369,266, filed on Mar. 29, 2019, now Pat. No. 10,631,047.

(51) Int. Cl.
*H04N 21/4402* (2011.01)
*H04N 21/472* (2011.01)
(Continued)

(52) U.S. Cl.
CPC ..... *H04N 21/4402* (2013.01); *H04N 21/4782* (2013.01); *H04N 21/47205* (2013.01); *H04N 21/6125* (2013.01); *H04N 21/8173* (2013.01)

(58) Field of Classification Search
CPC ......... H04N 21/4402; H04N 21/47205; H04N 21/4782; H04N 21/6125; H04N 21/8173
(Continued)

(56) References Cited

U.S. PATENT DOCUMENTS 5,452,435 A * 9/1995 Malouf ............... G11B 27/031
713/500
5,680,639 A * 10/1997 Milne .................. G06F 3/0481
715/202
(Continued)

FOREIGN PATENT DOCUMENTS

CN    106210451 A    12/2016
CN    103391403 B    8/2017

OTHER PUBLICATIONS

"Final Cut Pro X" Apple (IN)—Retrieved from: https://www.apple.com/in/final-cut-pro/ Retrieved on: Mar. 26, 2019 (14 pages total).
(Continued)

*Primary Examiner* — Loi H Tran
(74) *Attorney, Agent, or Firm* — John Maldjian; Maldjian Law Group LLC (57) ABSTRACT

A browser-based video editor is configured to allow a user to create a composition schema having multimedia layers, including video, audio, and graphic and text layers. The composition schema may be transmitted to a remote service that employs a rendering engine to play back the composition schema and align the clocks for each respective multimedia layer into a single video representation. A master clock object is employed to sync the clocks while also checking a series of properties with each multimedia layer to comport the multimedia layers with an interval-based master clock. The composition schema is recorded using FFmpeg (Fast Forward Moving Picture Experts Group) to create a video representation for user consumption, such as an MP4 (Motion Pictures Experts Group 4) formatted file.

20 Claims, 12 Drawing Sheets

(51) Int. Cl.
*H04N 21/81* (2011.01)
*H04N 21/61* (2011.01)
*H04N 21/4782* (2011.01)

(58) Field of Classification Search
USPC .......................................................... 386/278
See application file for complete search history.

(56) References Cited

U.S. PATENT DOCUMENTS

| | | | | |
|---|---|---|---|---|
| RE37,418 E | * | 10/2001 | Tindell | ................. G11B 27/034 715/202 |
| 6,433,266 B1 | * | 8/2002 | Fay | ..................... G10H 1/0041 84/609 |
| 7,073,127 B2 | | 7/2006 | Zhao et al. | |
| 7,336,280 B2 | * | 2/2008 | Nelson | ................. G06F 40/109 345/473 |
| 7,809,802 B2 | | 10/2010 | Lerman et al. | |
| 7,962,925 B2 | * | 6/2011 | Fry | ......................... G06F 8/427 719/328 |
| 8,249,153 B2 | | 8/2012 | Lestage et al. | |
| 8,818,172 B2 | | 8/2014 | Khatib et al. | |
| 8,997,169 B2 | | 3/2015 | McCoy et al. | |
| 9,032,297 B2 | | 5/2015 | Lovejoy et al. | |
| 9,129,640 B2 | | 9/2015 | Hamer | |
| 9,209,987 B2 | | 12/2015 | Bishop et al. | |
| 9,583,140 B1 | * | 2/2017 | Rady | ................ H04N 21/44016 |
| 9,620,169 B1 | | 4/2017 | Nolan et al. | |
| 10,123,065 B2 | | 11/2018 | Lyons et al. | |
| 2010/0225811 A1 | | 9/2010 | Konvisser | |
| 2011/0022943 A1 | * | 1/2011 | Bou-Ghannam | ... G06F 16/9574 715/234 |
| 2012/0014673 A1 | | 1/2012 | O'Dwyer | |
| 2013/0111056 A1 | * | 5/2013 | Prasad | ............. H04N 21/47202 709/231 |
| 2015/0149906 A1 | | 5/2015 | Toff et al. | |
| 2016/0011748 A1 | | 1/2016 | Zheng | |
| 2016/0322080 A1 | | 11/2016 | Stankiewicz | |
| 2016/0337718 A1 | | 11/2016 | Talbott | |
| 2016/0365115 A1 | | 12/2016 | Boliek et al. | |
| 2017/0099520 A1 | * | 4/2017 | Strickland | ............. G06T 1/0007 |
| 2017/0351648 A1 | * | 12/2017 | Batni | .................... G06F 40/106 |
| 2018/0373492 A1 | | 12/2018 | Millington | |
| 2019/0012136 A1 | | 1/2019 | Millington | |

OTHER PUBLICATIONS

Clipchamp—Retrieved from: https://clipchamp.com/en/ Retrieved on: Mar. 26, 2019 (6 pages total).
Movie Maker & Video Editor—Retrieved from: https://moviemakeronline.com/ Retrieved on: Mar. 26, 2019 (16 pages total).
Kizoa—Retrieved from: https://www.kizoa.com/ Retrieved on: Mar. 26, 2019 (3 pages total).
Wevideo—Retrieved from: https://www.wevideo.com/ Retrieved on: Mar. 26, 2019 (9 pages total).
Liu et al., "A New Design of Clock Synchronization Algorithm", Advances in Mechanical Engineering, vol. 2014, Article ID 958686, 9 pages, Hindawi Publishing Corporation.
"PTPv2 Timing protocol in AV networks", Luminex, Jun 6, 2017, Product announcements, Retrieved from: https://www.luminex.be/improve-your-timekeeping-with-ptpv2/ Retrieved on: Mar. 26, 2019 (11 pages total).
Macii, et al., "A Master—Slave Synchronization Model for Enhanced Servo Clock Design", DISI—Department of Information Engineering and Computer Science, Aug. 27, 2019 (6 pages total).
After Effects—Adobe—Retrieved from: https://www.adobe.com/in/products/aftereffects.html#x Retrieved on: Jan. 11, 2019 (13 pages total).
OpenShot Video Editor—Retrieved from: https://www.openshot.org/ Retrieved on: Jan. 10, 2019 (3 pages total).
International Search Report and Written Opinion dated Jan. 27, 2020, issued in connection with International Application No. PCT/US2019/065618 (12 pages total).

* cited by examiner

ONLINE VIDEO EDITOR

CROSS REFERENCE TO RELATED APPLICATION

This application is a Continuation of U.S. Non-Provisional application Ser. No. 16/369,266, filed Mar. 29, 2019, entitled "ONLINE VIDEO EDITOR," which is incorporated herein by reference in its entirety.

BACKGROUND

Users who engage in video editing on a computing device may combine and customize various multimedia layers into a composition schema, which may include video, audio, graphic and text layers, etc. When using a browser for video editing over the Internet, multimedia assets are stored externally and these sources (e.g., remote servers and computing devices) must send data asynchronously to the browser in order for the user to access multimedia not stored on their computing device. The browser-based video composition has the ability pull external resources from the Internet and manage these asynchronous tasks in order to successfully playback a video composition in the browser. However, there is a need to sync all external resources of each multimedia layer.

SUMMARY

A remote service accessible by a web browser operating on a user's computing device is configured to receive a composition schema and generate a video file that places each multimedia layer in the composition schema in sync with a master clock. Upon receiving the composition schema, the remote service may employ a rendering engine and a headless browser to execute a series of programs to check properties for each multimedia layer during playback. A master clock object operates at a constant rate (e.g., 30 frames per second (FPS)) and is applied to each multimedia layer during playback. Each layer type is controlled by its own respective class which includes: a video engine, audio engine, and graphic/text engine. The video engine may control a position and status of the video layers, the audio engine may control an audio layer status, and the graphic/text engine (e.g., SVG (scalable vector graphics) engine) may control the graphic or text layers that appear over the video.

The master clock object keeps each multimedia layer in sync with the master clock's constant and interval-based timer, which thereby puts the multimedia layers in sync with each other. At each tick of the master clock's interval-based timer, the master clock object checks the time in and time out values of each multimedia layer in the composition schema and the player determines whether to show or hide a multimedia layer at any given time during playback. Additionally, the player object checks the size, rotation, and opacity of graphical or text layers, including the colors and fonts for text layers, and checks the trim in and trim out values for the video and audio layers with the current time provided by the master clock.

During playback, the rendering engine streams the video playback of a composition provided by a remote service from the headless browser to FFmpeg (Fast Forward motion picture experts group), which records the total duration into an MPEG4 (Motion Pictures Experts Group 4) (hereinafter MP4) video file. During the FFmpeg process, the audio layer is combined with the video to create the final finished result, a video representation of the composition schema with audio, video, and all shape or text layers. The video representation may be transmitted to a storage service, which is accessible using a browser on the user's computing device.

The implementation of the master clock object enables multimedia layers having different clock intervals to comport with a single master clock timer and thereby put each multimedia layer in sync within a single video representation. Users can thereby access and utilize multimedia files on the internet and combine them into a single composition using the web-based video editor and, upon completion of the user's composition schema, records the composition schema into a user-friendly video representation format (e.g., MP4). Utilization of the video editor can increase the overall quality of the user's created composition and enable greater utilization of web-based multimedia sources.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

Like reference numerals indicate like elements in the drawings. Elements are not drawn to scale unless otherwise indicated.

DETAILED DESCRIPTION

Figure 1:
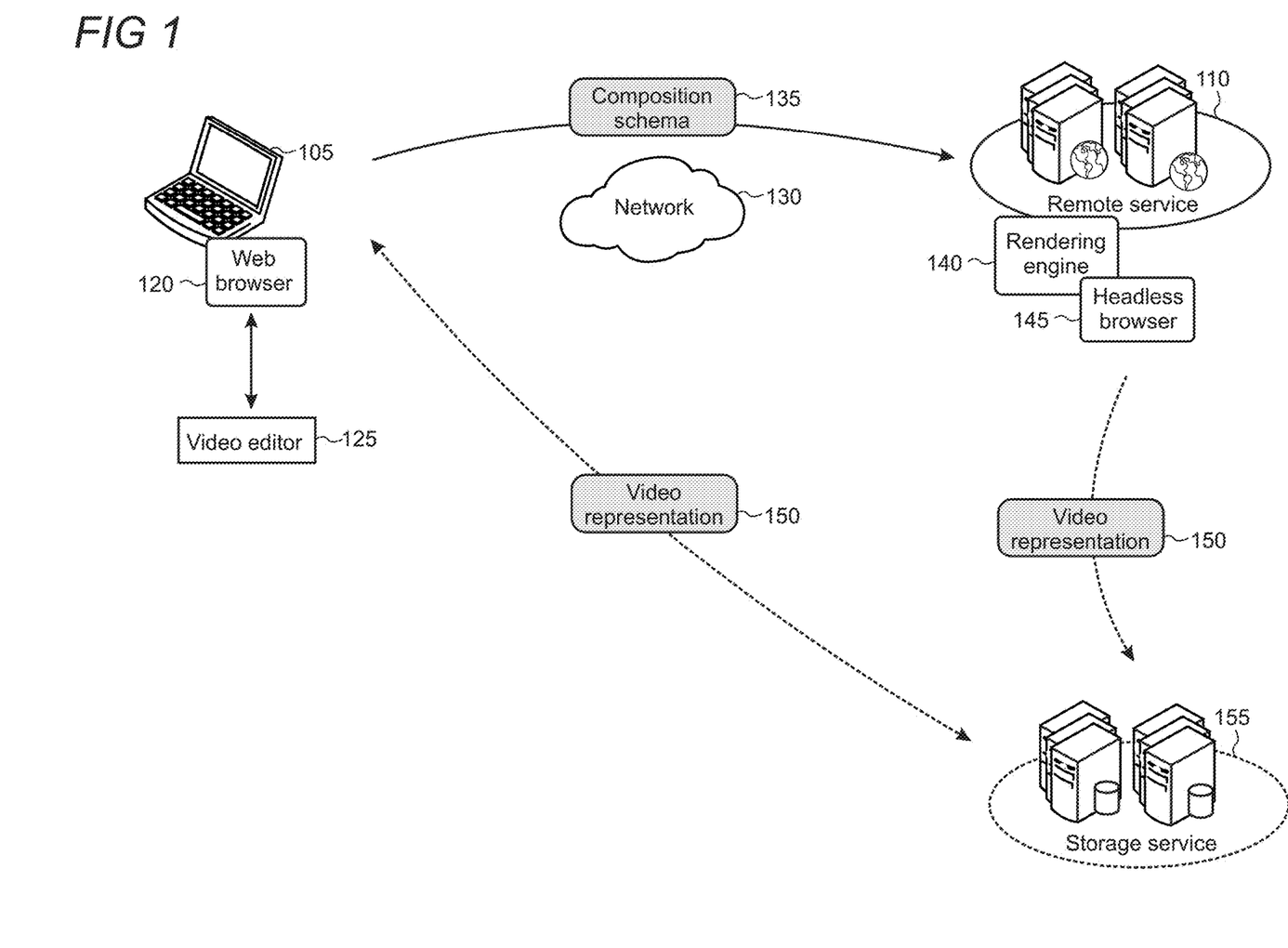
FIG. 1 shows an illustrative environment in which a rendering engine, operated by a remote service, generates a video representation from a composition schema transmitted by a computing device.

FIG. 1 shows an illustrative environment in which a computing device 105 generates and transmits a composition schema 135 to a remote service 110 over a network 130. The network may be a collection of routers and network devices forming a local area network, wide area network, the internet, and the world wide web to put different nodes of the network in communication with each other. The computing device uses a web browser 120 to access a video editor 125 for the user to create a video composition, such as in an MPEG4 (Moving Picture Experts Group 4) (hereinafter "MP4") formatted file.

The remote service employs a rendering engine 140, which uses a headless browser 145 to execute various processes and create a video representation 150 of the composition schema 135, as discussed in greater detail below. Upon creation, the remote service transmits the video representation to a storage service 155, which the computing device 105 can access using, e.g., the web browser 120. The storage service may send a reference to the video representation for playback in an instantiated player object in the user's web browser. While the storage service is depicted in FIG. 1, in other implementations the remote service may store and transmit the video representation to the computing device.

Figure 2:
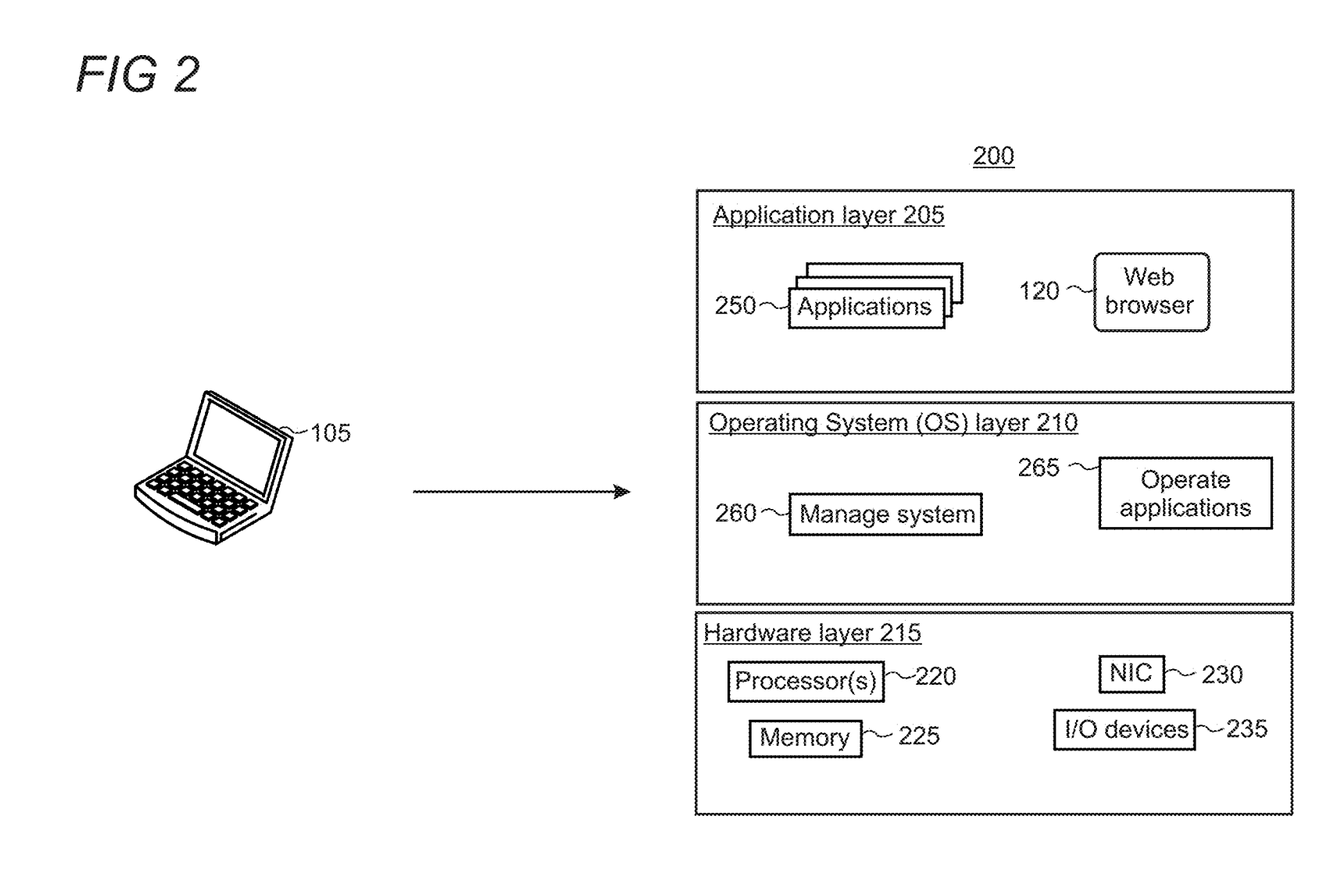
FIG. 2 shows an illustrative layered architecture of the computing device.

FIG. 2 shows an illustrative architecture 200 of the computing device 105 that may interconnect and/or communicate over various networks. A laptop computer is shown in the various figures for illustrative purposes, and other computing devices configured with a web browser and internet connectivity may also be utilized to perform the operations herein, including a desktop computer, smartphone, tablet computer, and the like (not shown).

The architecture is arranged in layers and includes a hardware layer 215, an operating system (OS) layer 210, and an application layer 205. The hardware layer 215 provides an abstraction of the various hardware used by the computing device 105 to the layers above it. In this illustrative example, the hardware layer supports one or more processors 220, memory 225, Input/Output (I/O) devices 235 (e.g., keyboard, speakers, mouse, touchscreen display, microphone, etc.), and a NIC (network interface controller) 230 including an interface for wireless or wired connections.

The application layer 205, in this illustrative example, supports various applications 250. Any number of applications can be utilized by the computing device 105, whether proprietary or third-party applications. For example, the web browser 120 may be implemented, which supports a user interface, browser engine, rendering engine, network connectivity, a JavaScript Interpreter, UI backend, and other components that may typically be implemented and utilized by a web browser application. The headless browser associated with the remote service (FIG. 1) may be an open source tool configured with similar functionality as the web browser 120 but is executed using a command-line interface instead of a graphical user interface (GUI), although a typical web browser using a GUI is also possible.

The applications can be implemented using locally executing code. However, in some cases, applications can rely on services and/or remote code execution provided by remote servers or other computing platforms. The OS layer 210 supports, among other operations, managing the operating system 260 and applications 265. The OS layer may interoperate with the application and hardware layers to facilitate execution of programs and perform various functions and features.

Figure 3:
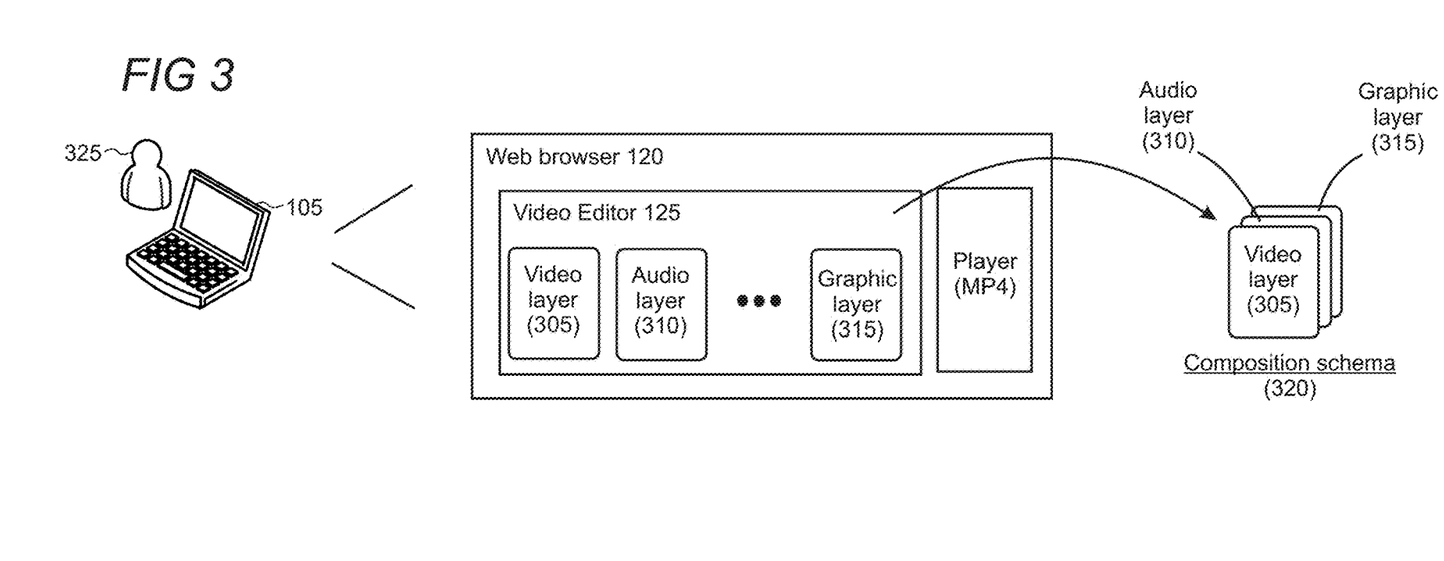
FIG. 3 shows an illustrative diagram in which the composition schema is generated from multimedia layers in a video editor.

FIG. 3 shows an illustrative environment in which a user 325 operating the computing device 105 accesses a video editor 125 using the web browser 120. The video editor may be accessible via a uniform resource locator (URL) directed to a specific website or domain. When using the video editor, the user may combine and customize various video, audio, and graphic or text layers, as illustratively shown by numerals 305, 310, and 315 (collectively "multimedia layers"). The user may, for example, combine sounds or music to a video clip while also placing static or animated text or graphics on top of the video. The multimedia layers may make up the composition schema 320 when the user is finished creating the video composition. The composition schema is a blueprint for the composition in JSON (JavaScript Object Notation) format, which includes paths to graphical resources, video, audio, and their respective scale, positions, and timings in the final composition. With this composition schema, the video editor can play back the composition live within the web browser using an instantiated player object.

Figure 4:
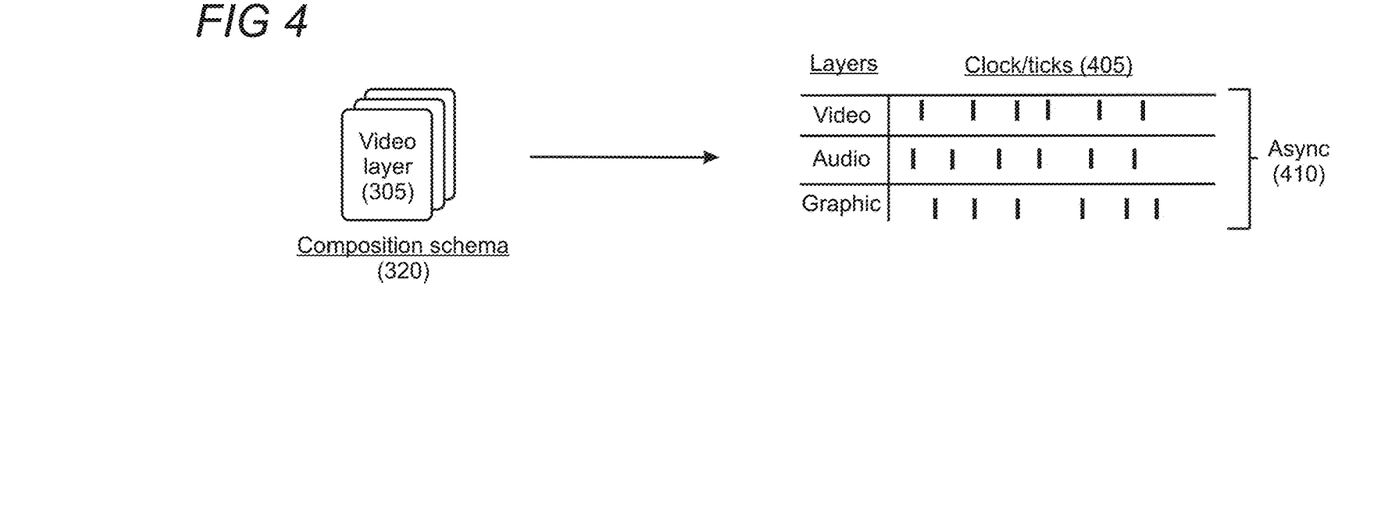
FIG. 4 shows the clocks for the multimedia layers of the composition schema being async.

FIG. 4 shows an illustrative environment in which the clock/ticks 405 trigger different actions on each multimedia layer that makes up the composition schema. This may occur, for example, when the user pulls data (e.g., a video, song, animation, etc.) for the composition schema from publicly accessible services or computing devices on the world wide web, or when changing the visibility of the layer within the composition. The timing and changes of properties of each multimedia layer within the composition may be different from each other, as graphically depicted in FIG. 4.

Figure 5:
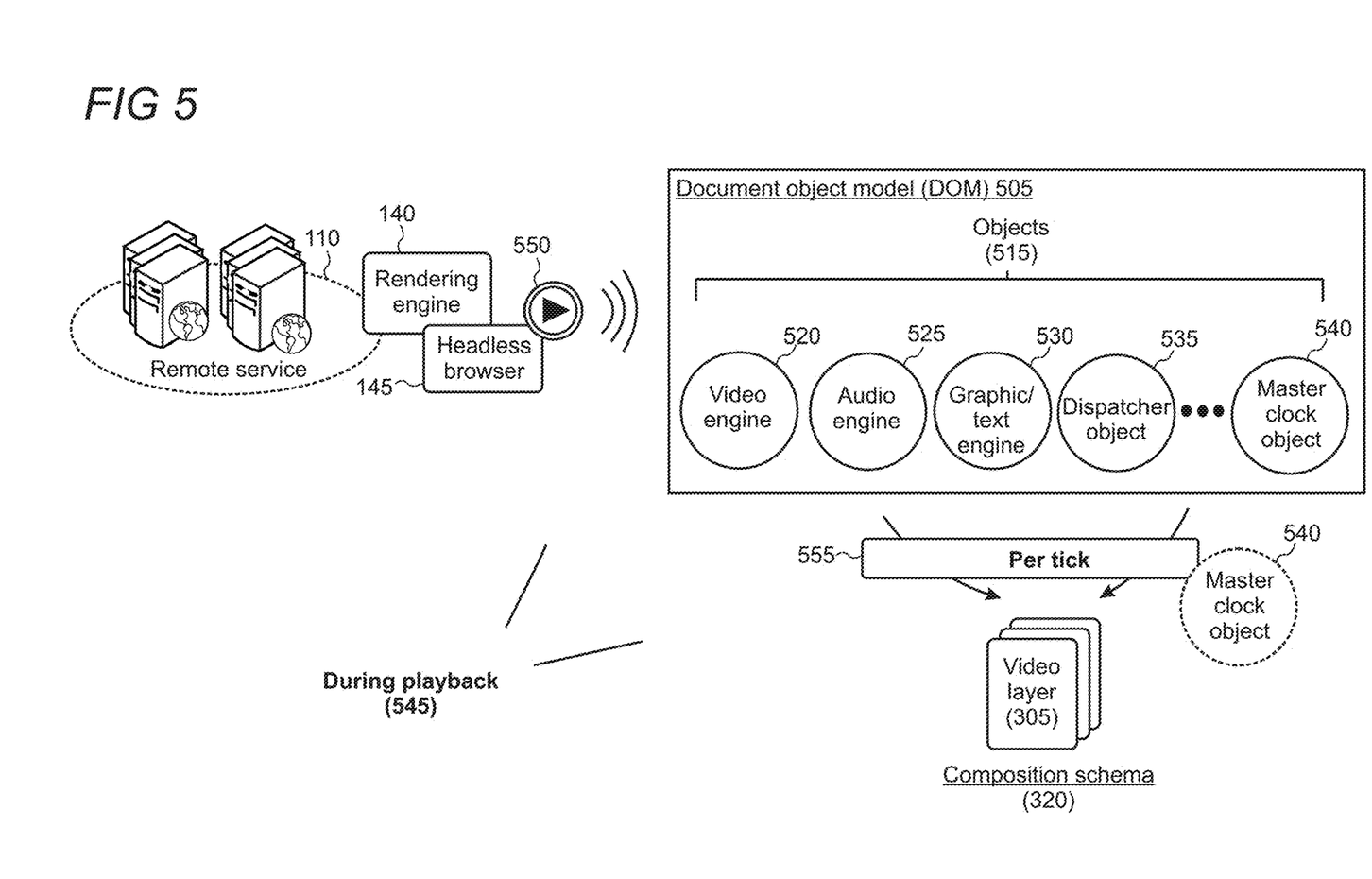
FIG. 5 shows an illustrative environment in which the remote service's headless browser applies a rendering engine to the composition schema during playback.

FIG. 5 shows an illustrative environment in which the remote service implements the rendering engine 140 with the headless browser 145 to generate a video representation from the composition schema 320. The rendering engine is configured to include the composition schema, the composition player that controls the playback of the composition schema, and the video recording process that generates the video representation, such as the MP4 formatted file.

The remote service 110 receives the composition schema 320 from the user's computing device 105. The remote service employs the rendering engine 140 to feed the composition schema into the composition player instantiated as a JavaScript object in the headless browser 145. The composition player is configured to play back 550 the composition schema such that, during initialization of the player, a series of JavaScript objects are instantiated within the document object model (DOM) 505, including a video engine 520, audio engine 525, graphic/text engine 530, dispatcher object 535, master clock object 540, and in other embodiments other objects that may not be shown (collectively "objects" as illustratively shown by numeral 515).

The video engine 520 may be configured to control the position and status of video layers, the audio engine 525 may control audio layer status, the graphic/text engine (e.g., an SVG (scalable vector graphics) engine) 530 may control the graphical or text layers that appear over the video, and the dispatcher object 535 may be configured to transmit updates of the properties of the elements within the DOM to the computing device 105.

Figure 6:
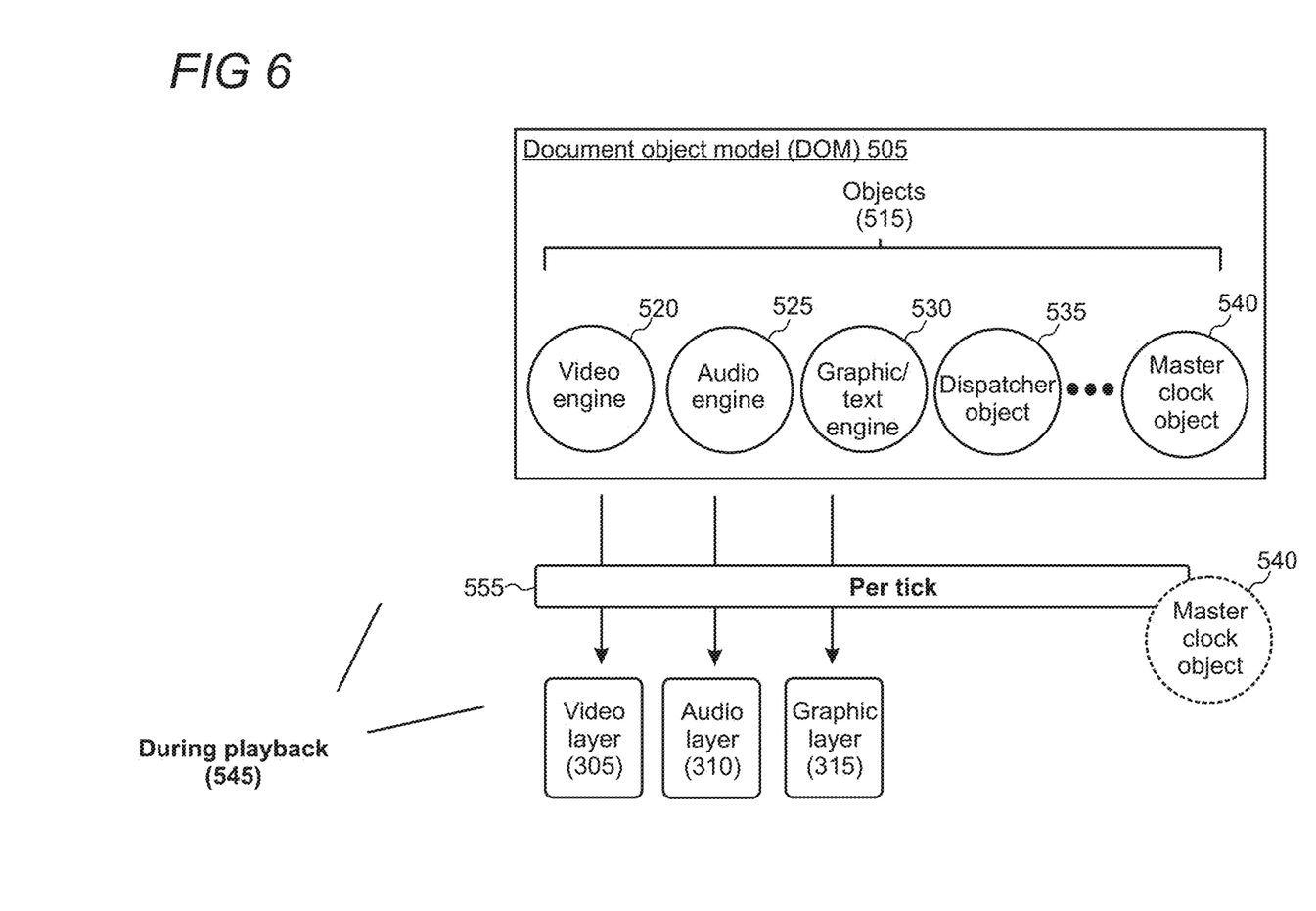
FIG. 6 shows an illustrative diagram in which specific rendering engines are applied to specific multimedia layers.

FIG. 6 shows an illustrative environment in which the video, audio, and graphic/text engines respectively process the video, audio, and graphic layers of the composition schema 320. The master clock object 540 executes a tick function by which a series of programs are executed to check the properties of each multimedia layer within the video engine 520, audio engine 525, and graphic/text engine 530, and determine their positions or visibility in the composition during playback. The master clock object operates during playback 545 and occurs on a per tick basis, as illustratively shown by numeral 555.

Figure 7:
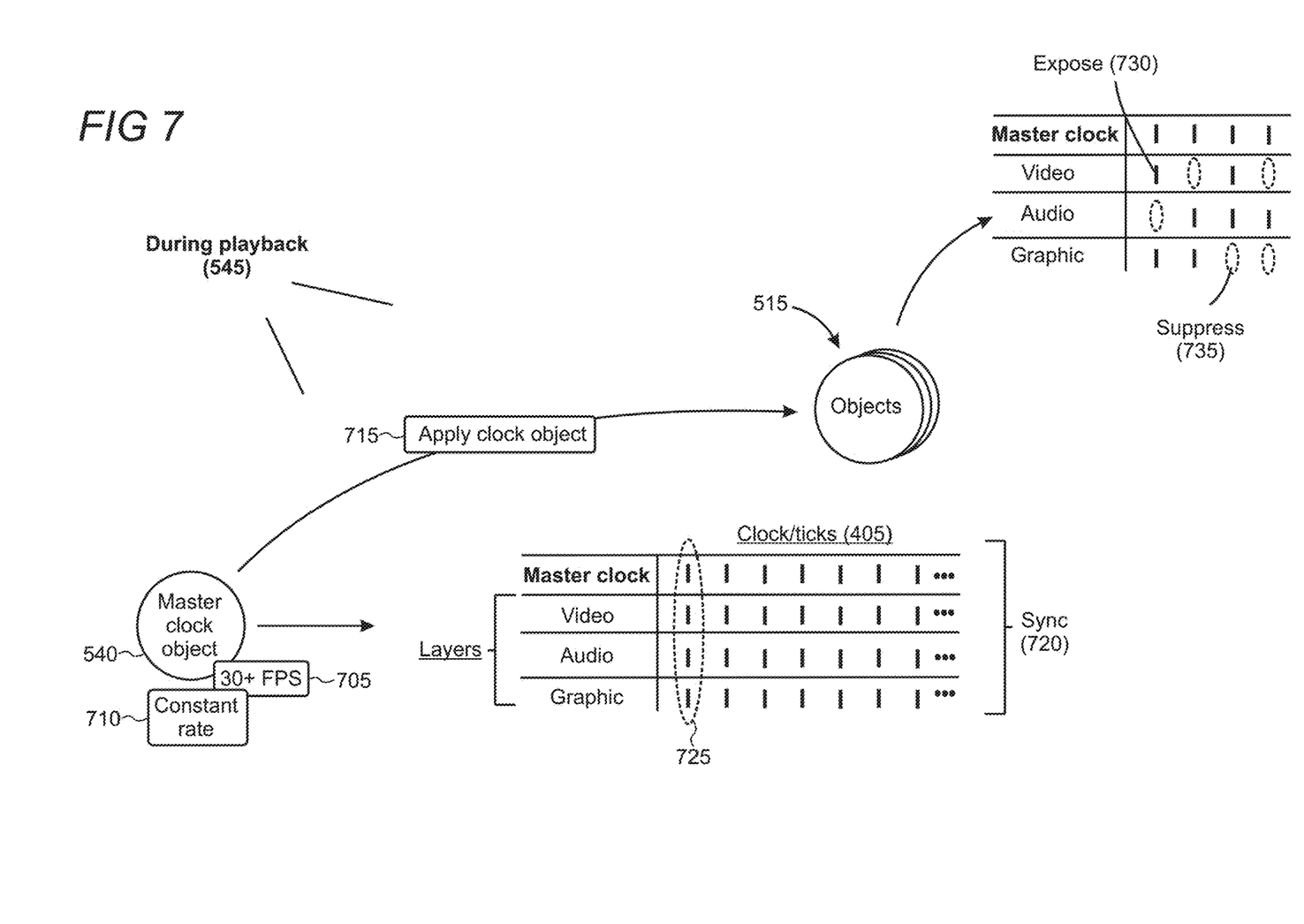
FIG. 7 shows an illustrative environment in which a master clock object syncs the clocks of, and controls the position and visibility of, each multimedia layer for the composition schema.

FIG. 7 shows an illustrative environment in which the master clock object 540 is applied to the multimedia layers in the composition schema 320 of the objects 515, as illustratively shown by numeral 715. The master clock object implements a tick function, which is an interval-based timer that operates at a constant rate 710 that can be at least 30 frames per second (FPS). At a frame rate of at least 30 FPS 705, the master clock function can be executed fast enough to accomplish smooth video playback within the computing device's web browser 120.

Figures 8, 9:
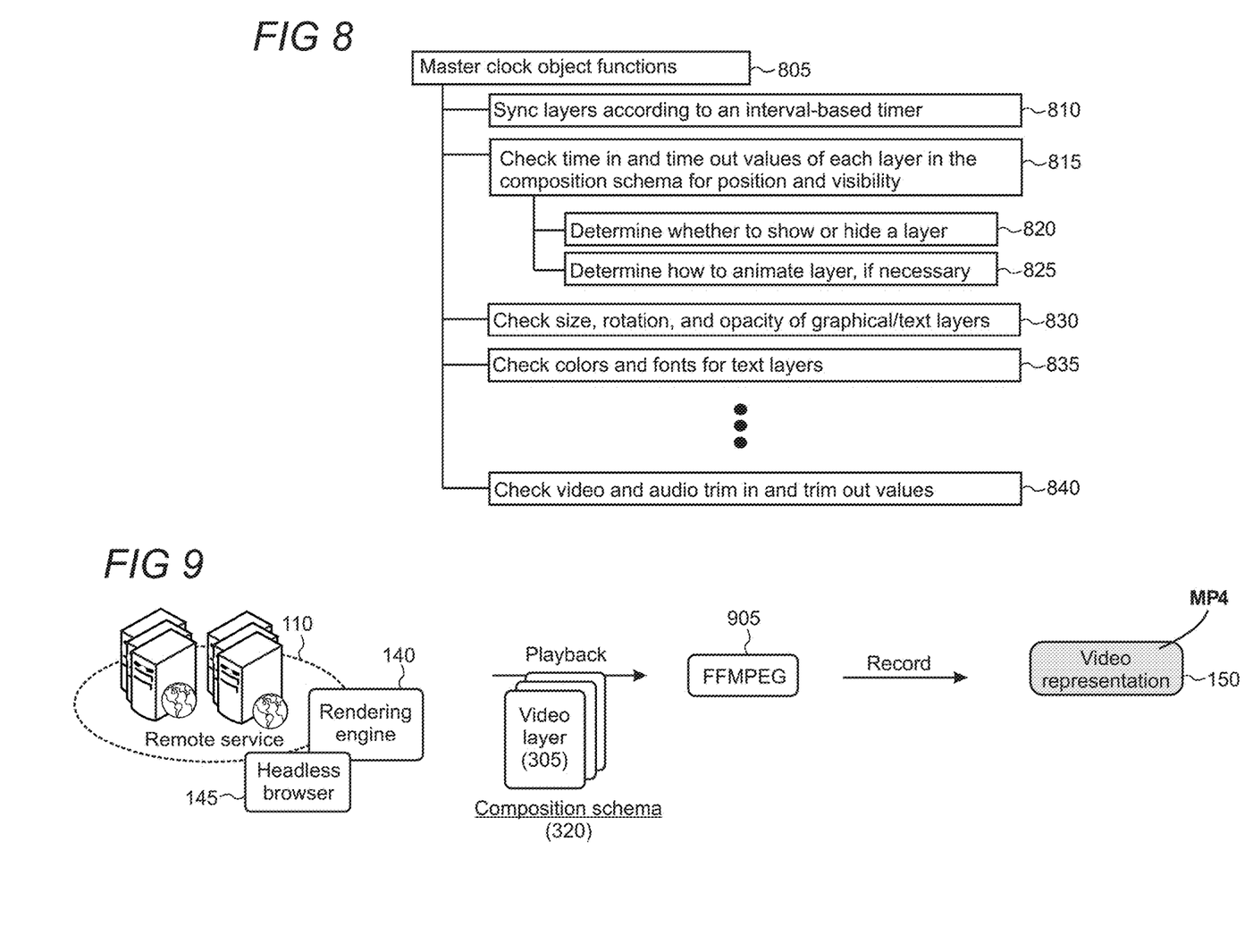
FIG. 8 shows an illustrative taxonomy of functions performed by the master clock object.
FIG. 9 shows an illustrative environment in which the remote service uses FFmpeg to record a video representation for the composition schema during playback.

The master clock object 540 is configured with a series of functions when applied to the various objects and multimedia layers. FIG. 8 shows an illustrative and non-exhaustive taxonomy of functions executed by the master clock object, as illustratively shown by numeral 805. Exemplary functions can include syncing multimedia layers according to an interval-based timer 810; checking time in and time out values of each multimedia layer in the composition schema for position and visibility 815, which can include determining whether to show or hide a layer 820 and determining how to animate a multimedia layer, if necessary 825; checking size, rotation, and opacity of graphical/text layers 830; checking colors and fonts for text layers 835; and checking audio and video trim in and trim out values 840.

Referring back to FIG. 7, the application of the master clock object 540 to the multimedia layers puts each layer in sync 720 with the timing of the master clock's interval-based timer, and thereby each other. Portion 725 illustratively shows each tick for the respective multimedia layers aligned with each other and the master clock.

As illustratively shown on the upper right table of FIG. 7, the master clock object also determines whether to expose (e.g., show, play, animate) 730 or suppress (e.g., hide, mute) 735 playback of the respective multimedia layers. Based on a current time in the composition player, any relevant layers are visible while layers that do not coincide with the current time are hidden. Each multimedia layer has its own model, which describes the position, scale, colors, and time in which it is visible in the composition, and details of the animation if applicable. When playback starts, the current time in the player is sent to the sync function, which aligns the playback of each piece of the composition (video, audio, and graphic/text).

FIG. 9 shows an illustrative environment in which the composition schema 320 is transformed into the video representation 150, which may be an MP4 formatted file. The rendering engine initializes playback of the composition schema after all external asset resources have been loaded, at which point the rendering engine streams the playback of the composition schema from the headless browser to FFmpeg 905, which records the total duration into an MP4 video file. During the FFmpeg process, the audio layer is combined with the video to create the final finished result, a video representation of the composition schema with audio, video, and all shape, graphic, or text layers. The video representation may be stored at the remote service or transmitted to a storage service 155 for access by the computing device 105.

Figure 10:
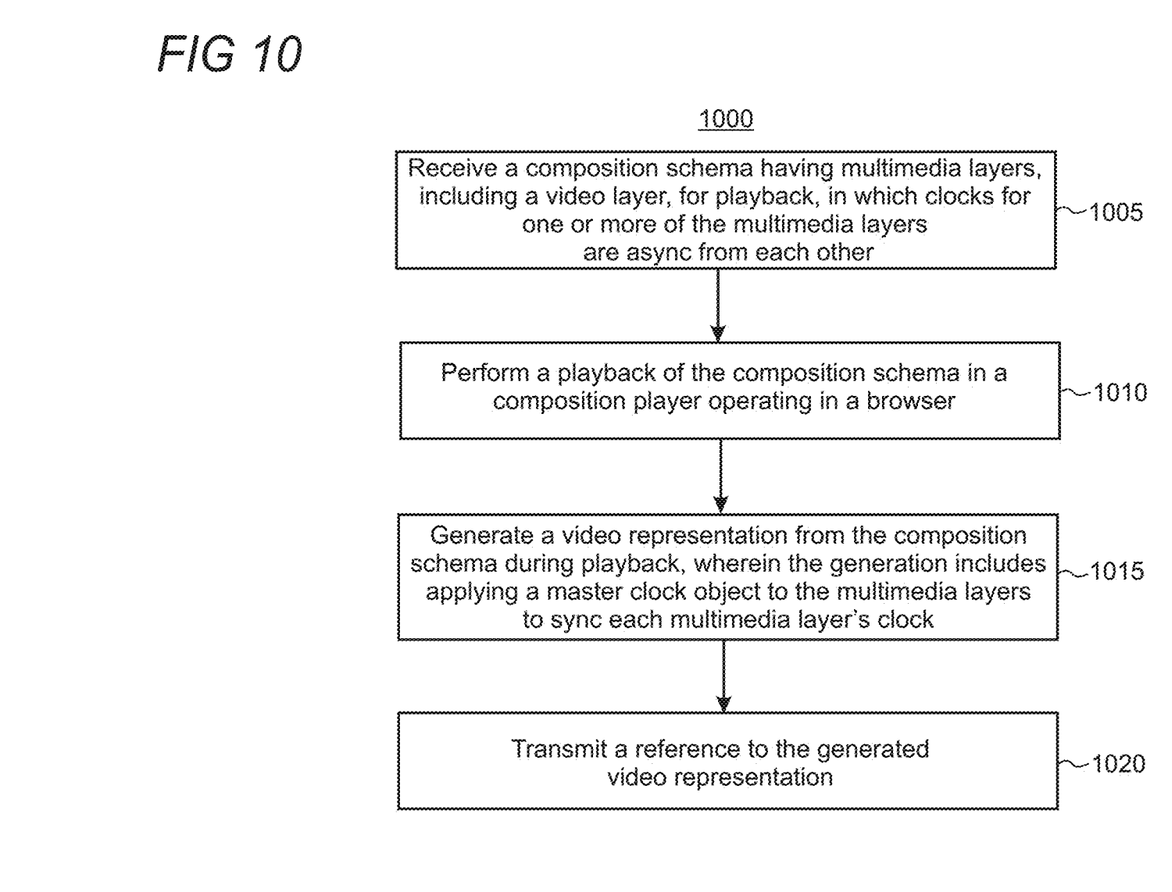
FIGS. 10-12 show flowcharts of illustrative methods performed by one or both of the computing device or the remote service.
Figure 11:
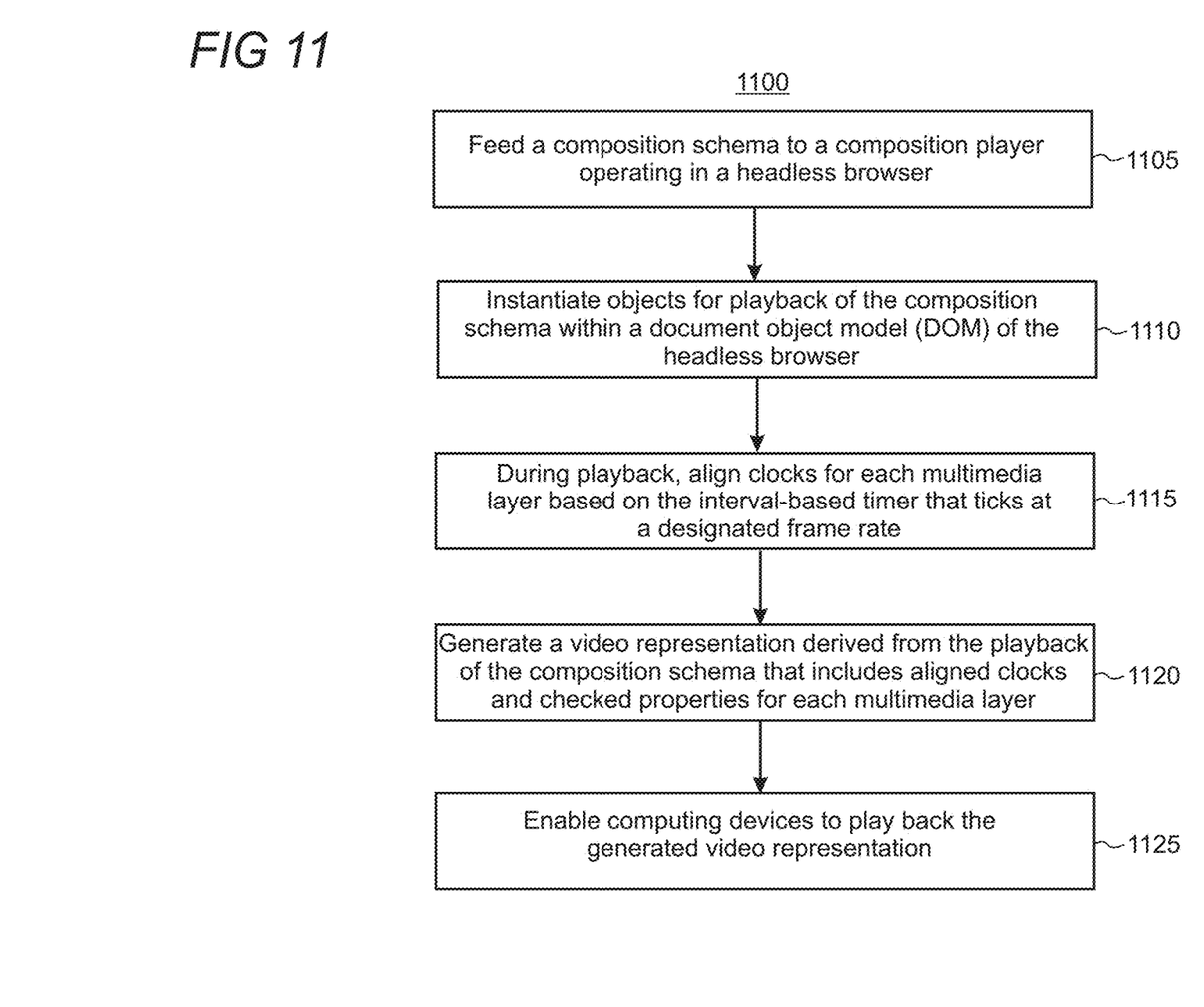
Figure 12:
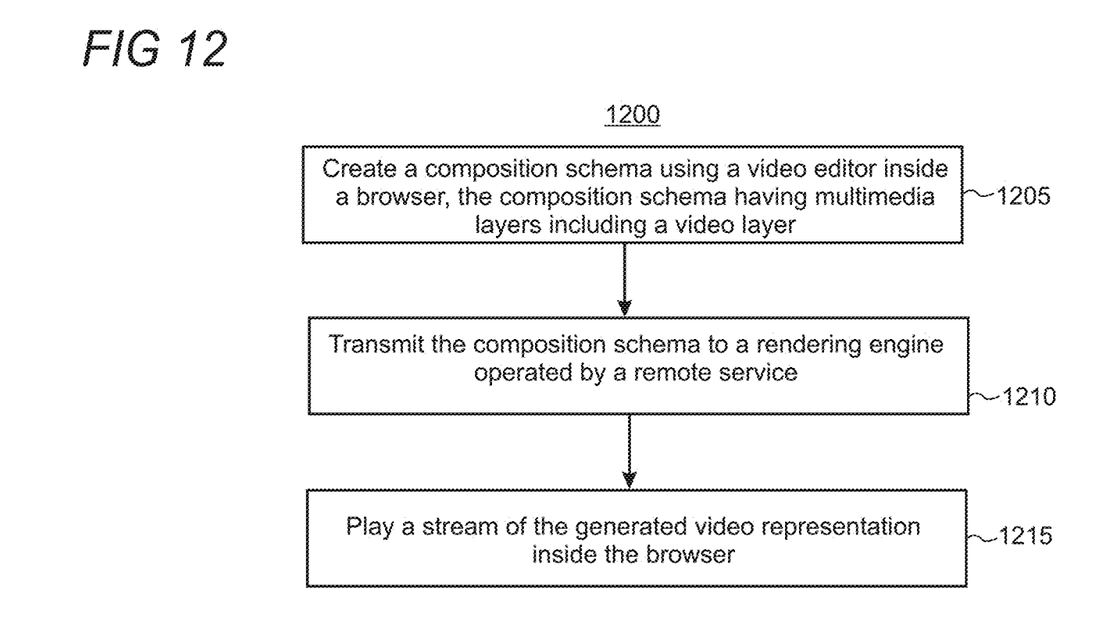

FIGS. 10-12 show flowcharts of illustrative methods which may be implemented by one or both of the computing device or remote service. Unless specifically stated, methods or steps shown in the flowcharts and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

FIG. 10 is a flowchart of an illustrative method 1000 performed by the remote service. In step 1005, the remote service receives a composition schema having multimedia layers, including a video layer, for playback, in which clocks for one or more of the multimedia layers are async from each other. In step 1010, the remote service performs playback of the composition schema in a composition player operating in a browser. In step 1015, the remote service generates a video representation from the composition schema during playback, in which the generation includes applying a master clock object to the multimedia layers to sync each multimedia layer's clock. In step 1020, the remote service transmits a reference to the generated video representation.

FIG. 11 is a flowchart of an illustrative method 1100 performed by the remote service. In step 1105, a rendering engine for the remote service feeds a composition schema to a composition player operating in a headless browser. In step 1110, the remote service instantiates objects for playback of the composition schema within a document object model (DOM) of the headless browser. In step 1115, the remote service, during playback, aligns clocks for each multimedia layer based on an interval-based timer that ticks at a designated frame rate. In step 1120, the remote service generates a video representation derived from the composition schema that includes aligned clocks and checked properties for each multimedia layer. In step 1125, the remote service enables computing devices to playback the generated video representation.

FIG. 12 is a flowchart of an illustrative method 1200 performed by a computing device. In step 1205, the computing device creates a composition schema using a video editor inside a browser, in which the composition schema has multimedia layers including a video layer. In step 1210, the computing device transmits the composition schema to a rendering engine operated by a remote service which generates a video representation from the composition schema. The video representation is a version in which each clock associated with the multimedia layers in the composition schema is aligned with an interval-based master clock. In step 1215, the computing device plays a stream of the generated video representation inside the browser.

Figure 13:
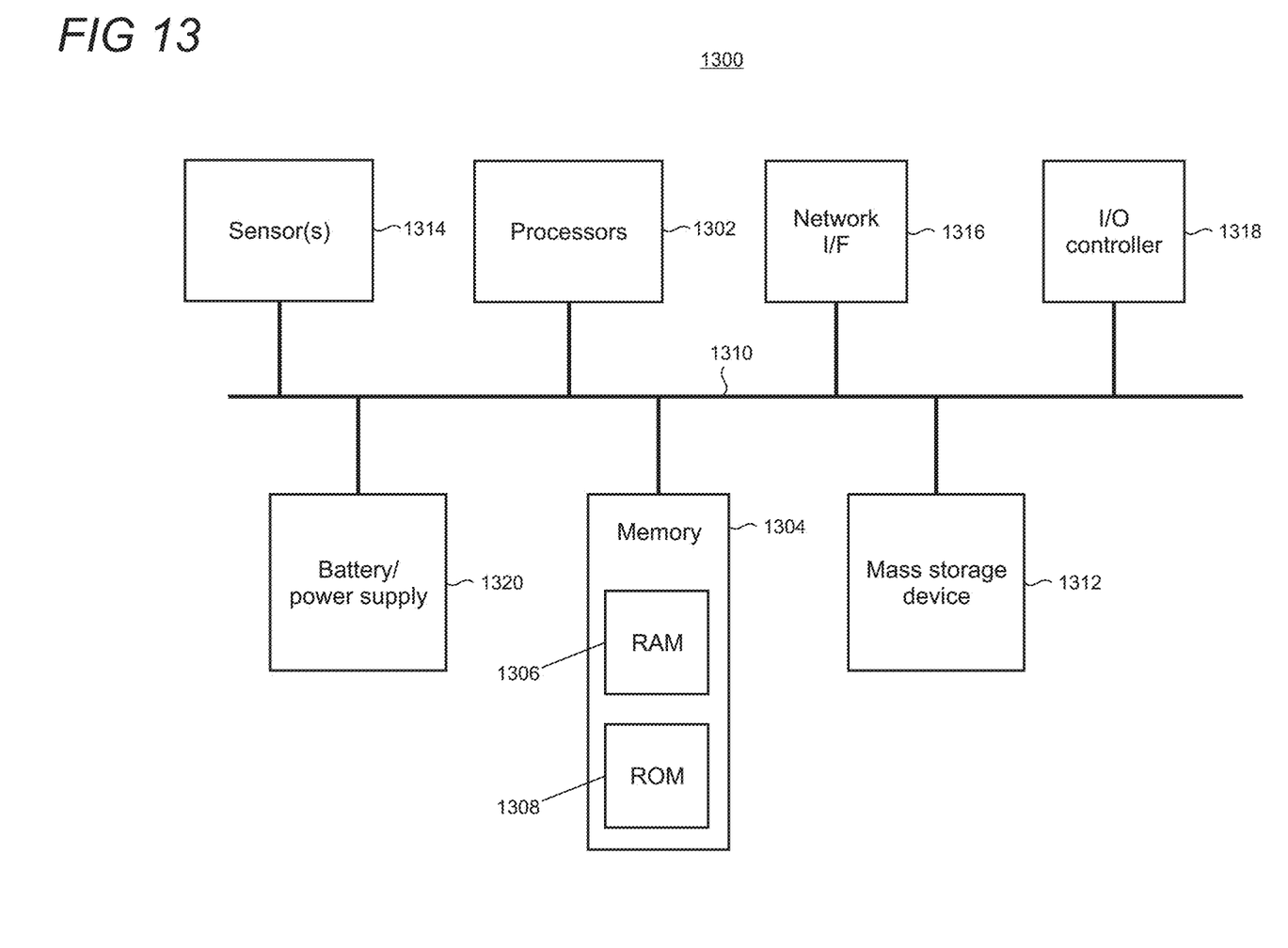
FIG. 13 is a simplified block diagram of an illustrative computing device that may be used at least in part to implement the present online video editor.

FIG. 13 shows an illustrative architecture 1300 for a computing device such as a laptop computer or personal computer for the present online video editor. The architecture 1300 illustrated in FIG. 13 includes one or more processors 1302 (e.g., central processing unit, dedicated Artificial Intelligence chip, graphics processing unit, etc.), a system memory 1304, including RAM (random access memory) 1306 and ROM (read only memory) 1308, and a system bus 1310 that operatively and functionally couples the components in the architecture 1300. A basic input/output system containing the basic routines that help to transfer information between elements within the architecture 1300, such as during startup, is typically stored in the ROM 1308. The architecture 1300 further includes a mass storage device 1312 for storing software code or other computer-executed code that is utilized to implement applications, the file system, and the operating system. The mass storage device 1312 is connected to the processor 1302 through a mass storage controller (not shown) connected to the bus 1310. The mass storage device 1312 and its associated computer-readable storage media provide non-volatile storage for the architecture 1300. Although the description of computer-readable storage media contained herein refers to a mass storage device, such as a hard disk or CD-ROM drive, it may be appreciated by those skilled in the art that computer-readable storage media can be any available storage media that can be accessed by the architecture 1300.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 1300.

According to various embodiments, the architecture 1300 may operate in a networked environment using logical connections to remote computers through a network. The architecture 1300 may connect to the network through a network interface unit 1316 connected to the bus 1310. It may be appreciated that the network interface unit 1316 also may be utilized to connect to other types of networks and remote computer systems. The architecture 1300 also may include an input/output controller 1318 for receiving and processing input from a number of other devices, including a keyboard, mouse, touchpad, touchscreen, control devices such as buttons and switches, or electronic stylus (not shown in FIG. 13). Similarly, the input/output controller 1318 may provide output to a display screen, user interface, a printer, or other type of output device (also not shown in FIG. 13).

It may be appreciated the software components described herein may, when loaded into the processor 1302 and executed, transform the processor 1302 and the overall architecture 1300 from a general-purpose computing system into a special-purpose computing system customized to facilitate the functionality presented herein. The processor 1302 may be constructed from any number of transistors or other discrete circuit elements, which may individually or collectively assume any number of states. More specifically, the processor 1302 may operate as a finite-state machine, in response to executable instructions contained within the software modules disclosed herein. These computer-executable instructions may transform the processor 1302 by specifying how the processor 1302 transitions between states, thereby transforming the transistors or other discrete hardware elements constituting the processor 1302.

Encoding the software modules presented herein also may transform the physical structure of the computer-readable storage media presented herein. The specific transformation of physical structure may depend on various factors in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

The architecture 1300 may further include one or more sensors 1314 or a battery or power supply 1320. The sensors may be coupled to the architecture to pick up data about an environment or a component, including temperature, pressure, etc. Exemplary sensors can include thermometers, accelerometer, smoke or gas sensor, pressure sensor (barometric or physical), light sensor, ultrasonic sensor, gyroscope, among others. The power supply may be adapted with an AC power cord or a battery, such as a rechargeable battery for portability.

In light of the above, it may be appreciated that many types of physical transformations take place in the architecture 1300 in order to store and execute the software components presented herein. It also may be appreciated that the architecture 1300 may include other types of computing devices, including wearable devices, handheld computers, embedded computer systems, smartphones, PDAs, and other types of computing devices known to those skilled in the art. It is also contemplated that the architecture 1300 may not include all of the components shown in FIG. 13, may include other components that are not explicitly shown in FIG. 13, or may utilize an architecture completely different from that shown in FIG. 13.

Figure 14:
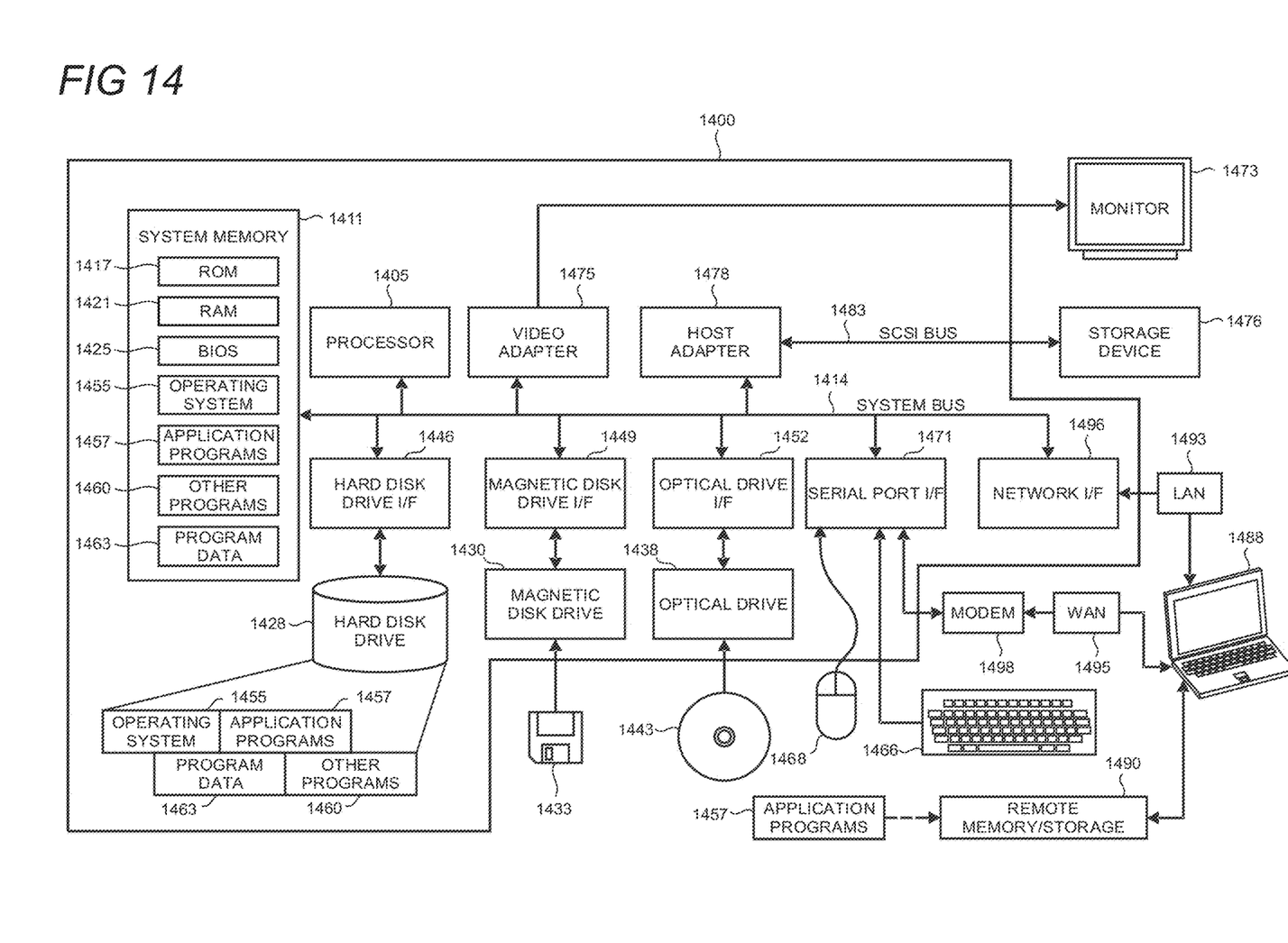
FIG. 14 is a simplified block diagram of an illustrative remote server or computer system that may be used in part to implement the present online video editor.

FIG. 14 is a simplified block diagram of an illustrative computer system 1400 such as a PC or server with which the present online video editor may be implemented. Computer system 1400 includes a processor 1405, a system memory 1411, and a system bus 1414 that couples various system components including the system memory 1411 to the processor 1405. The system bus 1414 may be any of several types of bus structures including a memory bus or memory controller, a peripheral bus, or a local bus using any of a variety of bus architectures. The system memory 1411 includes read only memory (ROM) 1417 and random access memory (RAM) 1421. A basic input/output system (BIOS) 1425, containing the basic routines that help to transfer information between elements within the computer system 1400, such as during startup, is stored in ROM 1417. The computer system 1400 may further include a hard disk drive 1428 for reading from and writing to an internally disposed hard disk (not shown), a magnetic disk drive 1430 for reading from or writing to a removable magnetic disk 1433 (e.g., a floppy disk), and an optical disk drive 1438 for reading from or writing to a removable optical disk 1443 such as a CD (compact disc), DVD (digital versatile disc), or other optical media. The hard disk drive 1428, magnetic disk drive 1430, and optical disk drive 1438 are connected to the system bus 1414 by a hard disk drive interface 1446, a magnetic disk drive interface 1449, and an optical drive interface 1452, respectively. The drives and their associated computer-readable storage media provide non-volatile storage of computer-readable instructions, data structures, program modules, and other data for the computer system 1400. Although this illustrative example includes a hard disk, a removable magnetic disk 1433, and a removable optical disk 1443, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present online video editor. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, are intended to cover non-transitory embodiments, and do not include waves, signals, and/or other transitory and/or intangible communication media.

A number of program modules may be stored on the hard disk, magnetic disk 1433, optical disk 1443, ROM 1417, or RAM 1421, including an operating system 1455, one or more application programs 1457, other program modules 1460, and program data 1463. A user may enter commands and information into the computer system 1400 through input devices such as a keyboard 1466 and pointing device 1468 such as a mouse. Other input devices (not shown) may include a microphone, joystick, game pad, satellite dish, scanner, trackball, touchpad, touchscreen, touch-sensitive device, voice-command module or device, user motion or user gesture capture device, or the like. These and other input devices are often connected to the processor 1405 through a serial port interface 1471 that is coupled to the system bus 1414, but may be connected by other interfaces, such as a parallel port, game port, or universal serial bus (USB). A monitor 1473 or other type of display device is also connected to the system bus 1414 via an interface, such as a video adapter 1475. In addition to the monitor 1473, personal computers typically include other peripheral output devices (not shown), such as speakers and printers. The illustrative example shown in FIG. 14 also includes a host adapter 1478, a Small Computer System Interface (SCSI) bus 1483, and an external storage device 1476 connected to the SCSI bus 1483.

The computer system 1400 is operable in a networked environment using logical connections to one or more remote computers, such as a remote computer 1488. The remote computer 1488 may be selected as another personal computer, a server, a router, a network PC, a peer device, or other common network node, and typically includes many or all of the elements described above relative to the computer system 1400, although only a single representative remote memory/storage device 1490 is shown in FIG. 14. The logical connections depicted in FIG. 14 include a local area network (LAN) 1493 and a wide area network (WAN) 1495. Such networking environments are often deployed, for example, in offices, enterprise-wide computer networks, intranets, and the Internet.

When used in a LAN networking environment, the computer system 1400 is connected to the local area network 1493 through a network interface or adapter 1496. When used in a WAN networking environment, the computer system 1400 typically includes a broadband modem 1498, network gateway, or other means for establishing communications over the wide area network 1495, such as the Internet. The broadband modem 1498, which may be internal or external, is connected to the system bus 1414 via a serial port interface 1471. In a networked environment, program modules related to the computer system 1400, or portions thereof, may be stored in the remote memory storage device 1490. It is noted that the network connections shown in FIG. 14 are illustrative and other means of establishing a communications link between the computers may be used depending on the specific requirements of an application of the present online video editor.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method to synchronize multimedia layers having varying timing and duration in a composition schema in a browser executing on a computing device connected to a network, the method comprising steps of:

instantiating objects within a Document Object Model (DOM) of the browser, wherein the objects include engines for each of the multimedia layers and a master clock operating an interval-based timer at a designated frame rate, wherein a video engine, audio engine, graph-ic/text engine, and dispatcher object are configured within the DOM to control a status of video layers, audio layers, graphical/text layers, and to transmit updates of properties of elements within the DOM, wherein the dispatcher object is instantiated within the DOM during an initialization of a composition player, and wherein the dispatcher object transmits updates of the properties of the video engine, audio engine, and graphic/text engine within the DOM to a computing device;

aligning, during a playback, clocks for all the multimedia layers based on the interval-based timer, wherein at each tick of the interval-based timer the master clock executes a series of operations to assure that properties of each of the multimedia layers are constant with the master clock on a per-tick basis, the properties include positions and visibility of the respective multimedia layers; and outputting a representation of the composition schema that includes the aligned clocks for all the multimedia layers.

2. The method of claim 1, wherein the series of operations includes:

checking time in and time out values of each of the multimedia layer;

determining whether to show or hide the respective of the multimedia layer; and determining animation of a graphic.

3. The method of claim 2, wherein the series of operations further includes checking trim in and trim out values for audio and video in the multimedia layers.

4. The method of claim 3, wherein the series of operations further includes checking a size, rotation, and opacity of graphics or text in the multimedia layers.

5. The method of claim 4, wherein the series of operations further includes checking colors and fonts for the text in the multimedia layers.

6. The method of claim 1, wherein the designated frame rate is higher than 30 FPS (frames per second).

7. The method of claim 1, wherein the browser is a headless browser, and further comprising a step of using FFmpeg (Fast Forward Moving Picture Experts Group), to record the composition schema into the video representation.

8. A system to synchronize multimedia layers having asynchronous clocks, varying timing and duration and including at least one video layer, in a composition schema on a browser executing in on a computing device connected to a network, the system comprising:
a processor configured to:
instantiate, within the browser, objects having engines for each of the multimedia layers and a master clock to provide an interval-based timer that functions at a designated frame rate, wherein a video engine, audio engine, graphic/text engine, and dispatcher object are configured within the DOM to control a status of video layers, audio layers, graphical/text layers, and to transmit updates of properties of elements within the DOM, wherein the dispatcher object is instantiated within the DOM during an initialization of a composition player, and wherein the dispatcher object transmits updates of the properties of the video engine, audio engine, and graphic/text engine within the DOM to a computing device;
align, during a playback, clocks for all of the multimedia layers using the interval-based timer, wherein at each tick of the interval-based timer the master clock executes a series of operations to assure that properties, including position and visibility of respective of the multimedia layers are constant with the master clock on a per-tick basis; and
output a representation of the composition schema in which each asynchronous clock associated with the multimedia layers is aligned with an interval-based master clock.

9. The system of claim 8, wherein the processor is further configured to check time in and time out values of each of the multimedia layers for position and visibility; and
determine whether to expose or suppress the multimedia layer in the representation.

10. The system of claim 9, wherein
the exposing comprises showing or animating video objects in the multimedia layer, and
the suppressing comprises hiding video objects in the multimedia layers.

11. The system of claim 9, wherein
the exposing comprises playing audio objects in the multimedia layer, and
the suppressing comprises muting audio objects in the multimedia layers.

12. The system of claim 8, wherein the processor is further configured to
check time in and time out values of each of the multimedia layers for position and visibility and
determine how to animate objects in the multimedia layer.

13. The system of claim 8, wherein the master clock is configured to operate at a constant rate.

14. The system of claim 8, wherein the multimedia layers are generated by operating a video editor on a computing device.

15. The system of claim 14, wherein the composition schema includes any of video, audio, and graphic layers.

16. A non-transitory computer-readable memory devices storing instructions which, when executed by one or more processors disposed in a computing device, cause the computing device to perform a method to synchronize multimedia layers having varying timing and duration in a composition schema in a browser executing on a computing device connected to a network, the method comprising steps of:
instantiating objects within a Document Object Model (DOM) of the browser, wherein the objects include engines for each of the multimedia layers and a master clock operating an interval-based timer at a designated frame rate, wherein a video engine, audio engine, graph-ic/text engine, and dispatcher object are configured within the DOM to control a status of video layers, audio layers, graphical/text layers, and to transmit updates of properties of elements within the DOM, wherein the dispatcher object is instantiated within the DOM during an initialization of a composition player, and wherein the dispatcher object transmits updates of the properties of the video engine, audio engine, and graphic/text engine within the DOM to a computing device;
aligning, during a playback, clocks for all the multimedia layers based on the interval-based timer, wherein at each tick of the interval-based timer the master clock executes a series of operations to assure that properties of each of the multimedia layers are constant with the master clock on a per-tick basis, the properties include positions and visibility of the respective multimedia layers; and
outputting a representation of the composition schema that includes the aligned clocks for all the multimedia layers.

17. The non-transitory computer-readable memory devices of claim 16, further comprising steps of playing the representation inside the web browser.

18. The non-transitory computer-readable memory devices of claim 16, wherein the composition schema provides paths to graphical resources, video, audio, and their respective scale, positions, and timings for use in the representation.

19. The non-transitory computer-readable memory devices of claim 18, wherein the composition scheme utilizes a JSON (JavaS-cript Object Notation) format.

20. The non-transitory computer-readable memory devices of claim 18, wherein the browser is a headless browser configured for live playback of the composition schema.

* * * * *